(Model.) 10 Sheets—Sheet 4.
M. E. BLOOD.
HARVESTING MACHINE.
No. 307,007. Patented Oct. 21, 1884.

(Model.)

M. E. BLOOD.
HARVESTING MACHINE.

Patented Oct. 21, 1884.

Witnesses:
Sylvanus Holcomb
Samuel W. Winders

Inventor:
Maurice E. Blood (Model.)

M. E. BLOOD.
HARVESTING MACHINE.

No. 307,007. Patented Oct. 21, 1884.

Witnesses:
Sylvanus Holcomb
Samuel W. Winders

Inventor:
Maurice E. Blood (Model.)

M. E. BLOOD.
HARVESTING MACHINE.

No. 307,007.  Patented Oct. 21, 1884.

Witnesses:
Sylvanus Holcomb
Samuel W. Winders

Inventor:
Marvin E. Blood (Model.) 10 Sheets—Sheet 9.
M. E. BLOOD.
HARVESTING MACHINE.
No. 307,007. Patented Oct. 21, 1884.

Witnesses:
Sylvanus Holcomb
Samuel W. Winders

Inventor:
Marvin E. Blood

UNITED STATES PATENT OFFICE.

MAURICE E. BLOOD, OF SYCAMORE, ILL., ASSIGNOR TO HIMSELF, CHARLES W. MARSH, AND WILLIAM W. MARSH, ALL OF SAME PLACE.

HARVESTING-MACHINE.

SPECIFICATION forming part of Letters Patent No. 307,007, dated October 21, 1884.

Application filed September 5, 1881. (Model.)

*To all whom it may concern:*

Be it known that I, MAURICE E. BLOOD, residing at Sycamore, in the county of De Kalb and State of Illinois, and a citizen of the United States, have invented new and useful Improvements in Harvesting-Machines, of which the following is a full description, reference being had to the accompanying drawings.

This invention relates to machines for cutting, raking, and binding grain automatically; and the novelty consists in the construction and arrangement of parts, as will be more fully hereinafter set forth, and specifically pointed out in the claims.

The essential features of the invention are fully illustrated in the accompanying drawings, which form a part of this specification, and in which—

Fig. 7 is a cross-section on line $x$ $x$ of Fig. 3, looking toward the grain-wheel. Figs. 8 and 9 are details, being a plan and side elevation, respectively, of the platform-rake; Fig. 10, an enlarged detail in section showing the driving-gear for the rake, the end guide, the head or support, and the pivot of the end guide; Fig. 10$^a$, a bottom plan view of part of Fig. 10; Figs. 11 and 12, enlarged details showing the connection for the rake upon the driving-chain; Fig. 13, a detail showing the form of the rake-head.

The main frame is formed of a front sill or beam, A, a rear sill, A', a grain-side piece, A'', cross-piece A$^3$, and a stubble-side piece, A$^4$, to furnish a support for the receiving-platform, the front sill or beam having located thereon the ordinary cutting apparatus $a$ $a$, operated by a pitman, $a''$, and a crank-wheel, $a^3$, and the grain-side piece, A'', is provided with a grain-wheel and a divider.

Figure 1:
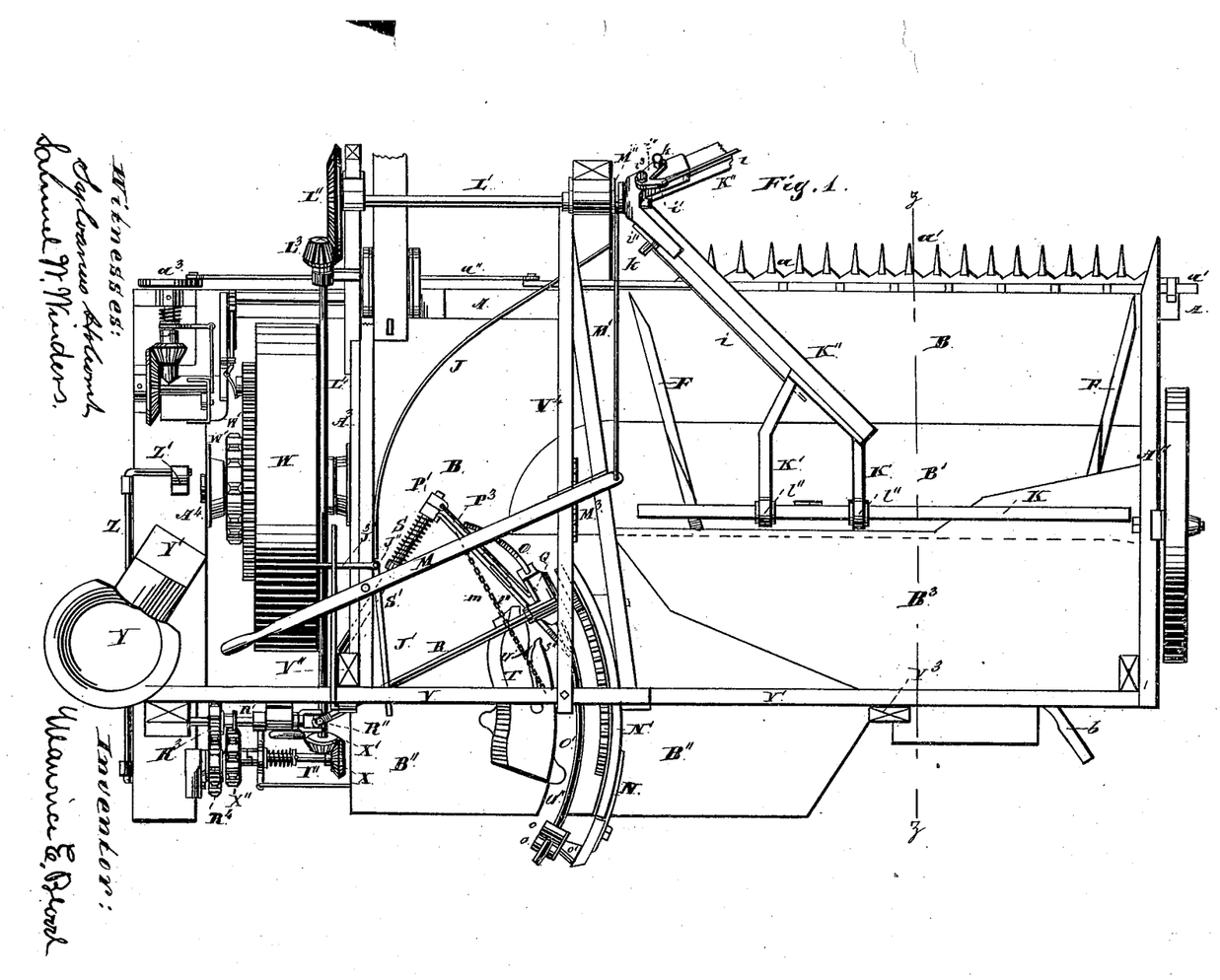
Figure 1 is a top or plan view of my invention.
Figure 2:
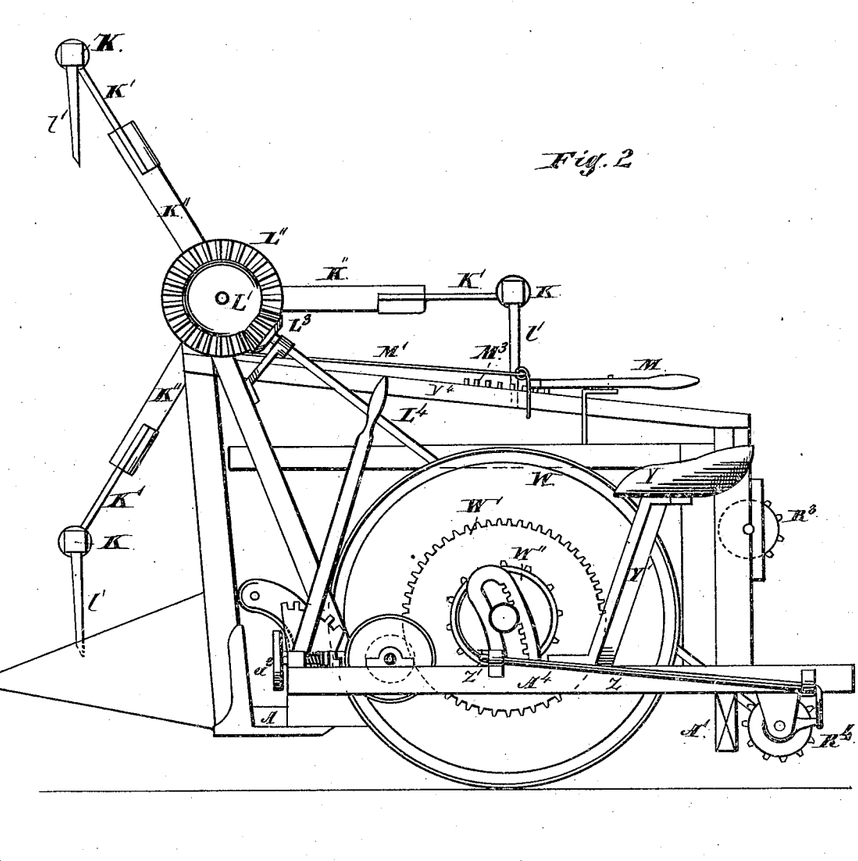
Fig. 2, a side elevation.
Figure 4:
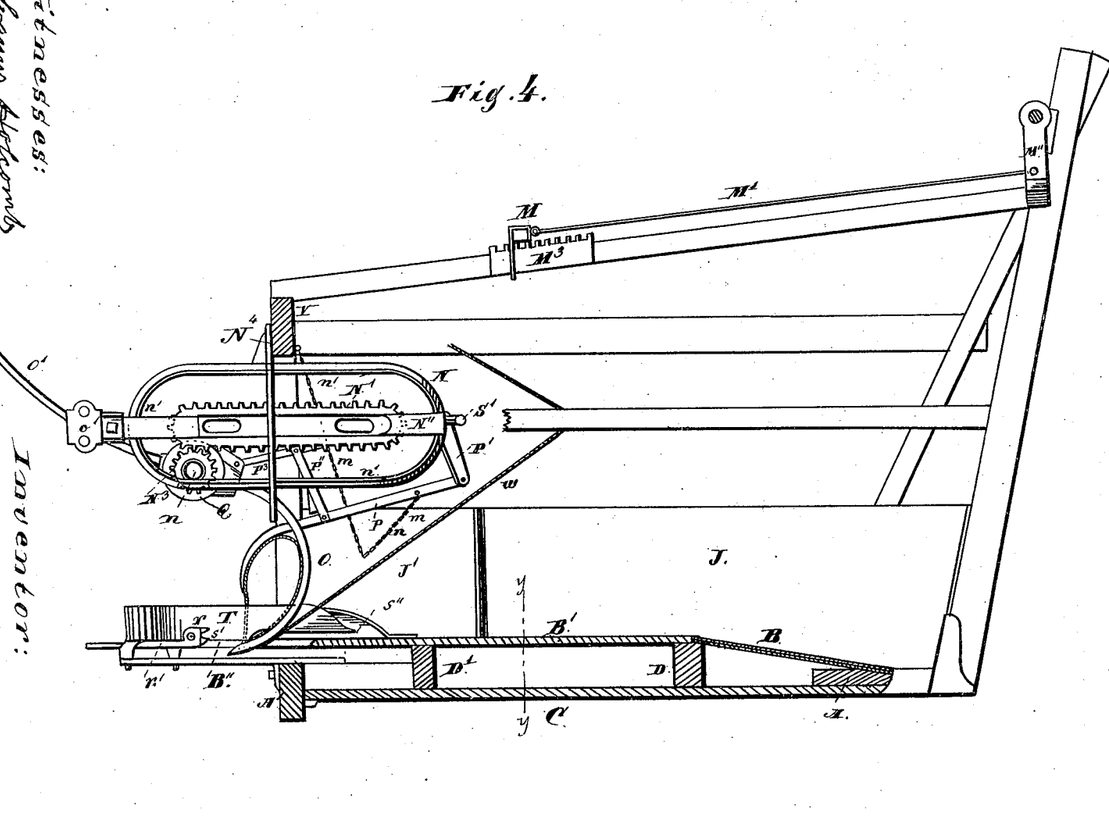
Fig. 4 is a section on the line $x$ $x$ of Fig. 1, looking toward the driving-wheel, said wheel and its connections being removed.
Figures 5, 6:
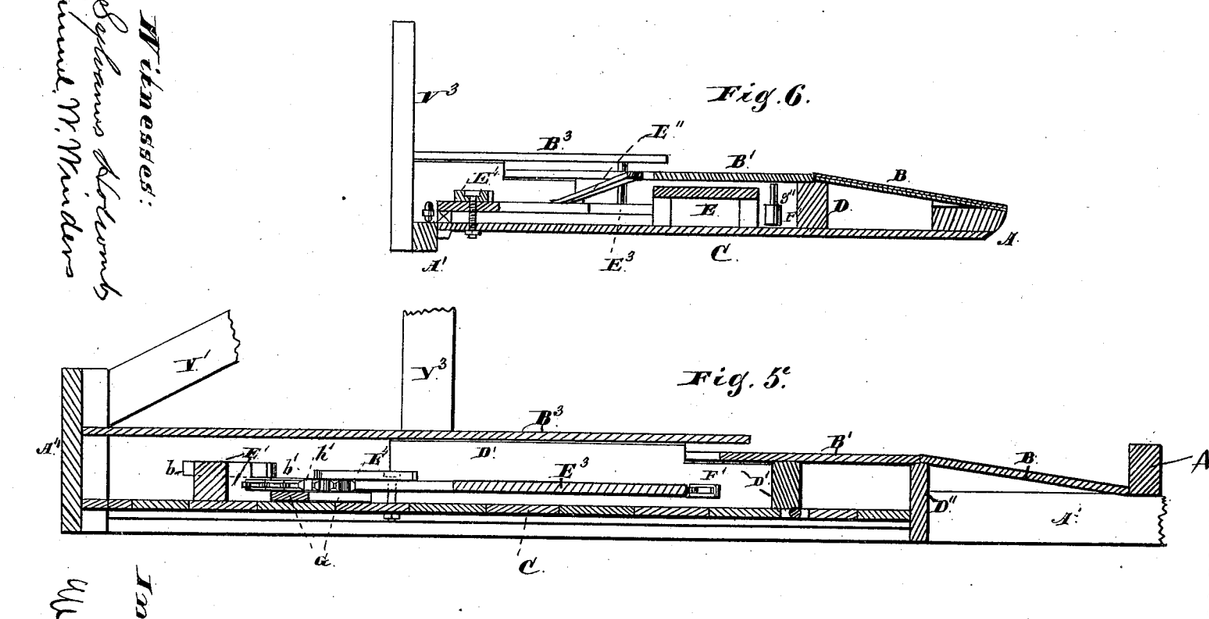
Fig. 5, a longitudinal section of the platform on lines $y$ $y$ of Figs. 3 and 4, looking toward the rear of the machine.
Fig. 6, a cross-section of the platform on lines $z$ $z$ of Fig. 1.
Figures 22, 23, 24, 25, 26, 27, 28:
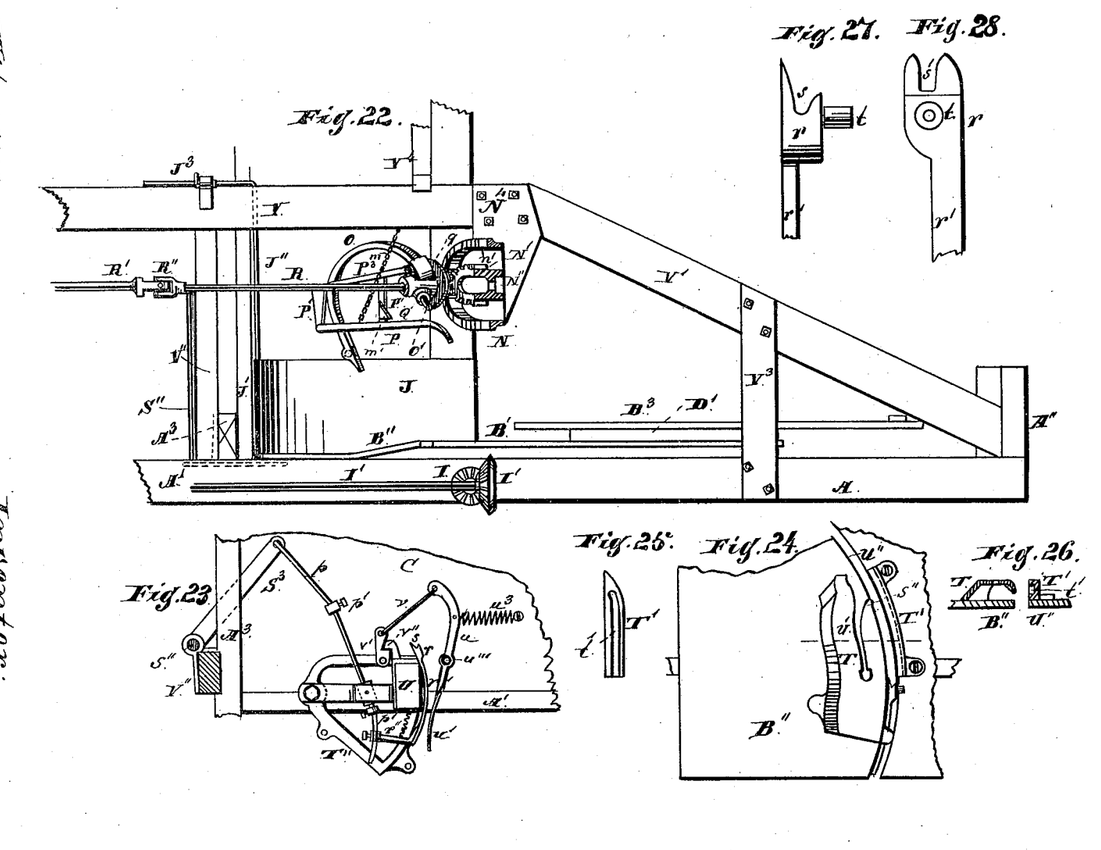
Fig. 22, a rear end elevation showing a portion of the framework and the binding-arm and its operating device, the rack for operating the arm being in section.
Fig. 23, a detail, being a plan view showing the knotter-carrier and the device for operating the same.
Fig. 24, a detail, being a plan view showing the guard or covering plate over the knotter or binder, and the slot in the binding-table in which the binding-arm travels.
Fig. 25, a detail showing the guide or passage in which the cord-carrier roller travels.
Fig. 26, a detail in cross-section showing the guard or covering plate and the guide or passage for the cord-carrier roller.
Figs. 27 and 28, enlarged details, being a top or plan view and a side elevation of the end of the cord-carrier.
Figures 29, 30, 31, 32, 33, 34, 35:
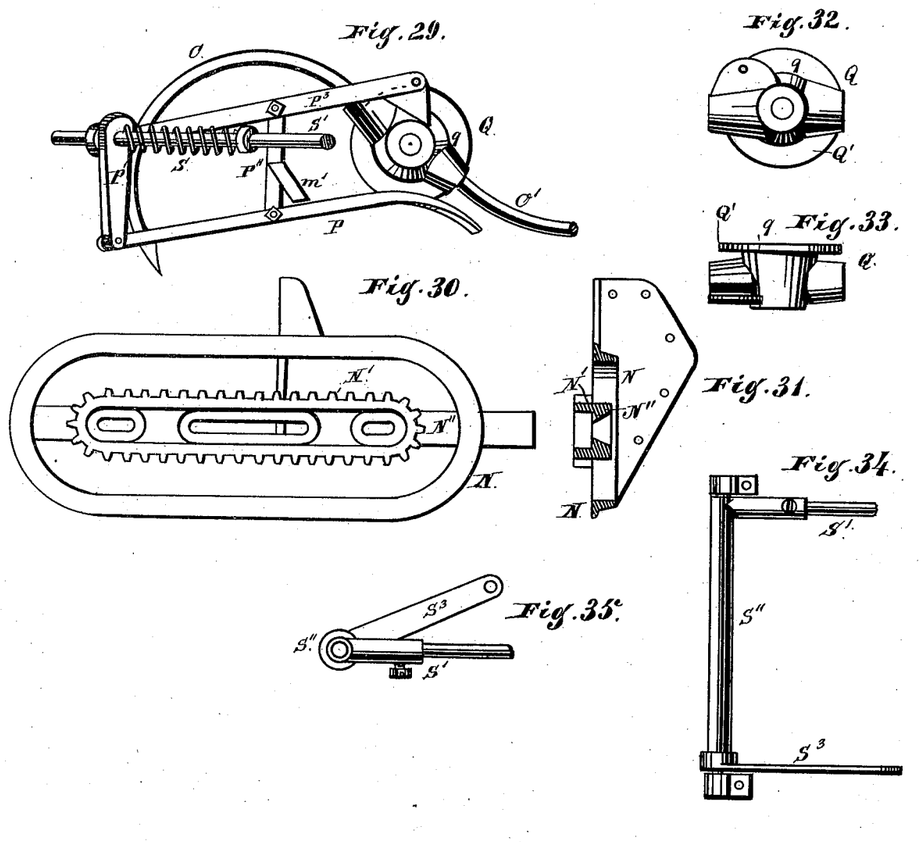
Fig. 29, a detail, being a side elevation showing the compressor-arm, binder-arm, and support therefor in their relation to each other.
Figs. 30 and 31, details, being a side elevation and a cross-section, respectively, of the rack and its frame by which the binding-arm is operated.
Figs. 32 and 33, details showing the block or head which supports or carries the binding-arm, being a top or plan view and an end elevation, respectively, of the same.
Fig. 34, a detail, being a side elevation of the crank or arm for operating the knotter or tying devices.
Fig. 35 is a detail view at right angles to Fig. 34.

The platform is made in three sections. The first section, B, is attached at its front end to the sill A, and extends back in an upward direction, as shown in Figs. 4, 6, and 7, and has its inner end curved around the second section, B', and extended back, as shown in Fig. 1, and this portion of the section B is also given an upward inclination toward the section B', as shown in Fig. 22. This turned end of the section B extends back, and the rear portion is expanded to form the binding-table B". The second section, B', is located on a higher plane than the finger-beam, and forms a cover for the chain-guides, &c., of the rake-operating mechanism, and between the section B' and the binder-table is the open space B⁴, in which the rake operates. The third section, B³, is located on a still higher plane, and its front edge projects slightly over the rear edge of the section B'. This section B³ forms a cover for mechanism for operating the rake, and also forms a support on which the heads of the grain will lie while being carried to the binder.

Within the main frame is located a secondary frame, formed of pieces D D' D", the piece D" standing parallel with the grain-side piece, A", and the piece D extending from the piece A" to the piece D", parallel with the front and rear frame-pieces, A A'. The piece D' runs diagonally from the piece D" to the rear beam, A'. This secondary frame forms a support for the sections B B' B³ of the receiving-platform, the sections B B' resting on and being secured to the pieces D D", and the section B³ secured to the piece D', which also forms a guide against which the blade of the rake comes when folded on its return movement. In the space within this secondary frame are located the guides, by means of which the rake is folded and projected.

Figure 3:
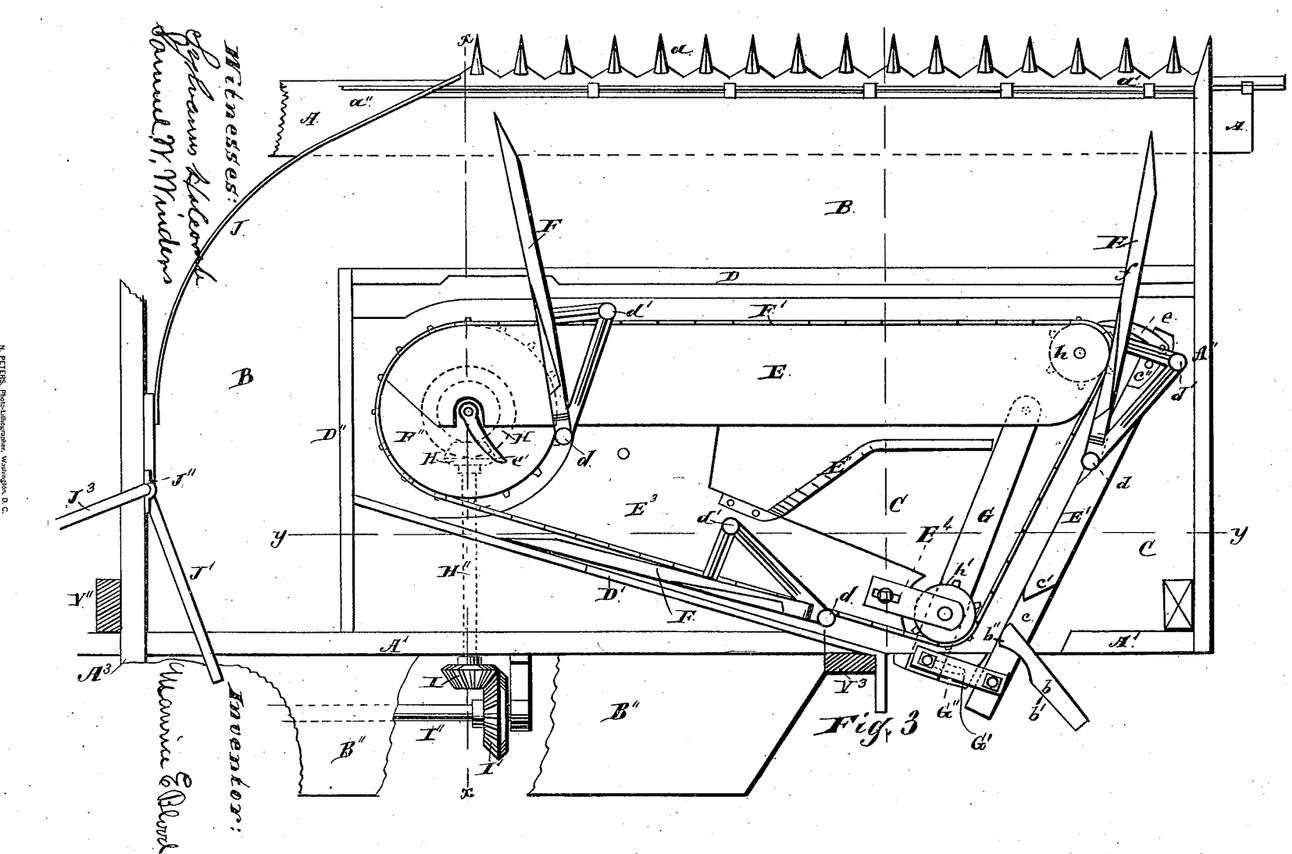
Fig. 3, a top or plan view of the receiving-platform with the cover removed to show the rake and devices for operating the same.

The main guide E is located on suitable standards attached to the bottom C, and it runs parallel with the forward and rear sills and longitudinally across the receiving-platform. The end guide, E', rests upon the bottom C, and its front end is pivoted by a pin, c", so that its rear end can swing on such pivot. The upper face of this guide E' is formed on two planes, as shown in Fig. 3, and to the upper face of the rear end or portion is secured a secondary guide, b, so as to leave an opening, c, between its back and the face c' of the higher portion, which face c' is inclined, as shown in Fig. 3, and furnishes the means by which the rake is turned at the end of its receding movement, and is brought into position to engage this guide E', to be projected into position for use.

Just in rear of the main guide E is located the guide or support E", secured at one end to the platform C, and extending up from said platform for about half its length on an incline, (see Fig. 6,) and for the rest of its length extending out horizontally in a plane parallel with the plane of the bottom C. This horizontal portion is on the same level as section B'. The object of this guide E" is to raise the rake-blade as the rake is being turned, so that such blade will clear the upper face of the guide E and be raised in position to pass over section B', to be projected and do its work. The rakes are held up on their return movement by a support or platform, E³, as shown in Figs. 3, 5, and 6. This support E³ is arranged above the bottom C and supported upon such bottom with its edge adjacent to the diagonal piece D' and runs parallel with such piece, and is in a lower plane than the guide E, a portion of the opposite edge of the support E³ extending to the guide E, and the remainder of the edge being cut away, as shown in Fig. 3, and to its outer end is attached a piece, E⁴, the upper face of which is nearly in the same plane as the upper face of the guide E, and forms a support or bridge by which the head of the rake is held up while it is passing from the support E³ to the guide E'.

Figures 8, 11:
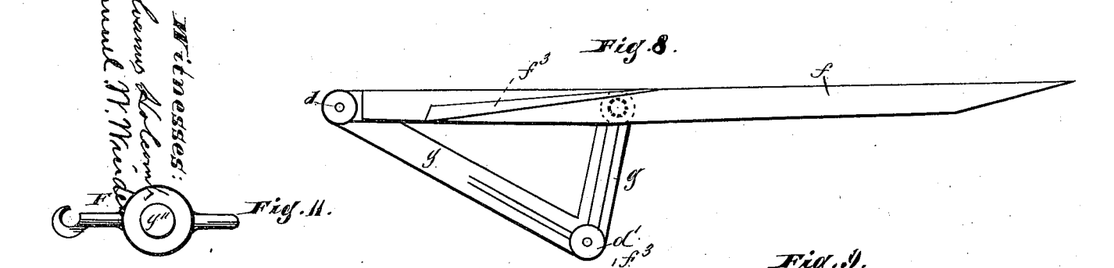
Figures 9, 10, 10A, 12, 13:
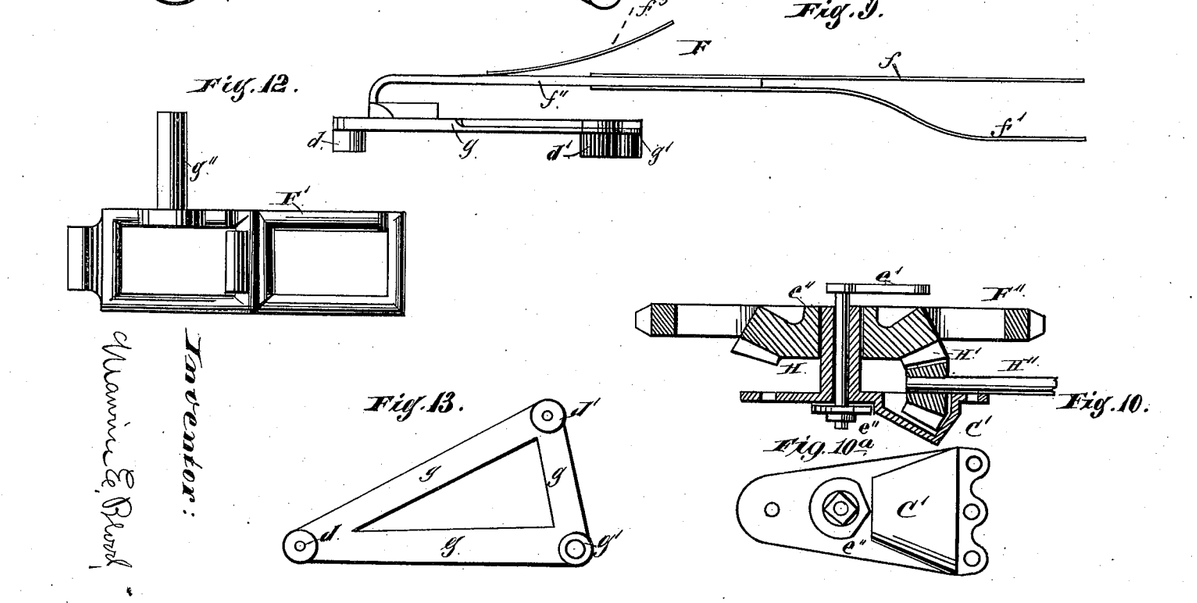

As shown, three rakes, F, are provided, each of which is formed of a blade consisting of two parts, f f', one part, f, being straight and the other part, f', being curved downward, so as to leave a space between their outer ends, which are beveled, as shown in Fig. 8. The inner end of the part f is attached to the upper face of the outer end of an arm, f", and the inner end of the part f' is attached to the under face of this arm f", and on the upper face of the arm f" is attached another part, f³, of the rake, this latter part being curved or bent, so that its outer end will be above the upper face of the support f". The parts f f' f³, with the body of the support f", form the acting portion of the rake, and the outer ends of the section f f' are spread apart, and the outer end of the section f³ is elevated for the purpose of furnishing a deeper or wider surface to engage the grain. The arm f" has its inner end bent around so as to form a secondary portion standing parallel with the main body, which portion is secured by rivets or otherwise to the upper face of one of the side pieces of a triangular-shaped frame or support, g, as shown in Figs. 8 and 13. On the under face of this frame g at one of the angles is a hub, g', having a central circular opening therein, and at the remaining angles are located rollers d d'.

The rakes F are attached to and carried by a chain, F', by means of pins g", formed on the chain-links, which enter the opening in the hub g' on the frame g, so as to pivot each rake to the chain, the pins g" being located so as bring the rakes equidistant from each other on the chain. The chain F' is driven by the main sprocket-wheel F" and runs around smaller sprocket-wheels h h', one of which, h, is journaled on an arbor extending up from the bottom C at a point to bring the wheel below and in line with the front outer corner of the guide E, and the other, h', is similarly journaled on the rear end of a swinging bar, G, pivoted at its front end to the bottom C, its rear end being arranged to bring the sprocket-wheel h at the proper point for the rake to be engaged by the guide b and be turned thereby. This sprocket-wheel h' also acts as a chain-tightener, the rear end of the bar G being swung out or in, as required, to give the chain the proper tension, and when in position is locked by a bolt, the stem of which passes through a slot formed in a casting, G''', attached to the sill A'. The outer end of the bridge E⁴ receives the end of the journal for the wheel h', and in order to permit its adjustment the end of this bridge E⁴, which is attached to the platform E³, is slotted to allow the bridge to move with the wheel.

The rear end of the guide E' and the rear end of the bar G are connected by a strap, G', which allows them to move together and maintain the proper distance between them for the turning and guiding of the rake.

On the under face of the sprocket-wheel F''' is a beveled gear-wheel, H, which meshes with a pinion, H', on shaft H'', which also carries beveled gear-wheel I, which meshes with pinion I' on shaft I'', journaled in the sill A', and driven by a sprocket-wheel, X'', a sprocket-wheel, W', on the axle of the drive-wheel, and a connecting-chain.

The operation of this part of the invention will be readily understood. The sprocket-wheel F'' carries the chain F' around, and with it the rakes F. Each rake as it moves across the platform will, with reference to the line of movement of the rake, have its forward end slightly in advance. As the rake reaches the inner end of the guide E the roller d will strike the face of the arm e' and hold the rear end of the rake stationary, allowing its forward end to describe an arc of a circle around the wheel F'', which movement continues until the main body of the rake has passed sufficiently beyond the center of said wheel F'' for the roller d to be drawn down on the face of the guide or arm e' by the action of the chain and pass from such guide. This draws the rear end of the rake in advance, with its side in contact with the face of the diagonal piece D', the rake being entirely beneath the cover B³. When the rake has turned about the wheel F'', the grain will have been carried by the rake into position, so as to lie parallel, or nearly so, with the cutter-bar, with the heads lying in the direction of the standing grain, or nearly so. The movement of the rake continues until the roller d passes the sprocket-wheel h' and strikes the face b' of the guide b, along which it passes, drawing the front end of the rake around by reason of the pivot g' passing around the sprocket-wheel h', which movement continues until the pivot g' has passed around such sprocket-wheel and commences its movement toward the sprocket-wheel h, drawing the roller d back on the face b', causing it to pass the end b'' and engage the guide E', the roller d' at the time the pivot g' is passing around the sprocket-wheel h' having entered the opening c and passed the end c' to the opposite side of the guide E, so that by the advance of the rake the rollers d d' will be on opposite sides of the guide E', holding the rake-front with its end in position to be projected, as shown in Fig.

3. As the front end of the rake passes from one position to the other in being turned, the under section, f', will be brought in contact with the support E'', bringing the two portions f f' together, or nearly so, and raising them so that they will pass above the division B', the main portion of the arm or support f'' being also above B', the secondary portion and the frame g being below B' and over the guide E. As the roller d' reaches the front end of the guide E', it passes on the outer face of the bridge e, which, as the rake is carried around the end of the guide E, forms a support for the frame g when it passes over on the guide E.

Each rake will be given in succession the movement just described, and in Fig. 3 the three rakes are shown in different positions. The rakes are so timed that as one rake is passing a point on the platform in line with the inner end of the sickle another will have come into position to take the grain from the outer divider and carry it across the platform, and so on continuously, and by this arrangement it will be observed that the grain falling upon the platform as it is cut is taken by the rakes in the position in which it falls and carried around by them and delivered to the binder in a transverse position to that in which it was received, and in position to be taken by the binding-arm, bound, and discharged at the rear of the machine.

The covers B' and B³ are so arranged in relation to each other and to the rake-operating mechanism that no grain, chaff, or dirt can enter or obstruct the rake-operating devices. At the same time they keep the falling grain away from the rakes while turning to come into position to be projected near the outside divider where they begin to do the raking.

Figures 14, 15, 16, 17, 18, 19, 20, 21:
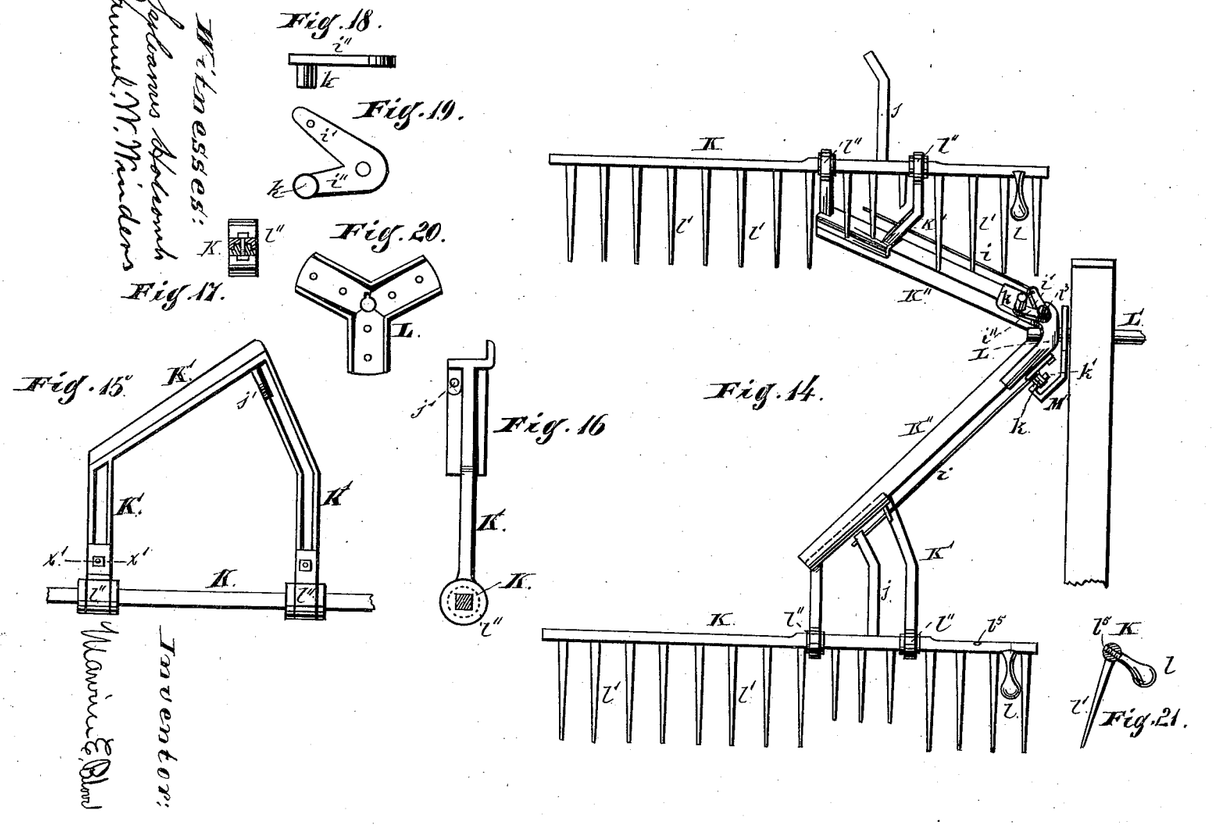
Fig. 14, a detail—a front elevation of the reel.
Figs. 15 and 16, details, being a plan view and side elevation, respectively, of the casting or support in which the blade or head of the reel-rake is journaled.
Fig. 17, a detail cross-section on line $x'$ $x'$ of Fig. 15.
Figs. 18 and 19, enlarged details, being an edge view and a plan view of the device for tripping the reel-rakes.
Fig. 20 is a detail, being an inside view of the reel-spider.
Fig. 21 is a detail, being a cross-section of the rake-head, showing the balancing-weight and a rake-tooth.

As shown, three reel-rakes are provided, each consisting of a head or blade, K, in which is a series of rake-teeth, l'. Each head is suspended at the outer end of a reel-arm, K'', by means of a frame or support, K', formed as shown in Fig. 15, with two arms joined by an inclined end piece, by which it is attached to the reel-arm. In the ends of the side arms of this frame K' are located journals l'', in which the reel-blade is mounted, so that it is free to turn, and, in order to allow it to swing entirely around, the teeth l' between the journals l'' are made so short as to pass the reel-arm.

The reel-arms K'' can be secured to a spider, L, (see Fig. 20,) which has as many wings as there are reel-arms, three being shown. On the exterior face of each wing of the spider is attached, by means of a pivot, i³, a bell-crank lever, or trigger consisting of two arms, i' i'', the pivot i³ being located at the junction of the arms.

On the arm i'' is located a pin or stud, k, which furnishes a means for tripping the lever, and also acts as a weight to return the lever to position, and to the outer end of the other arm, i', is connected a rod, i, the other end of which passes through the opening $j'$, formed in a flange on the inner side piece of the frame K' just beneath the end piece, as shown in Figs. 15 and 16. This rod projects into the space between the arms of the frame K', so that its end will engage with the outer end of an arm, $j$, attached to the rake-head opposite its teeth, as shown in Fig. 14.

Back of the reel-spider, and pivoted thereto or loosely mounted on the reel-shaft, is a pendant, M'', the free end of which is bent so as to stand in a plane corresponding to the incline of the rake-arms, and on this free end is formed a catch or stop, $k'$, so arranged as to be in the arc of a circle described by the pins $k$ in the revolution of the reel, and engage such pins to turn the levers $i'$ $i''$ on their pivots $i^3$, so as to withdraw the end of the rod $i$ from engagement with the arm and allow the reel-blade to turn on its journal at the completion of the reeling.

To the pendant M'' is attached one end of a rod, M', the other end being attached to the end of a lever, M, the other end of which lever extends back and is within reach of the driver when mounted on his seat, so that he can adjust the position of the pendant M'' and its catch forward or back to trip the reel at any desired point in front of the sickle, at the sickle, or back of the sickle, the lever, when the pendant M'' is in the desired position, being locked and held by a notched plate, M³.

The reel is mounted on the end of a shaft, L', which has its bearings in posts extending up from the main frame, and is driven by means of a beveled gear-wheel, L'', which meshes with a beveled gear-wheel, L³, on the end of a diagonal shaft, L⁴, on the other end of which is a miter-wheel, X', which meshes with a miter-wheel, X, on the shaft I''.

In operation, the reel is actuated by means of the gear and shafts just described, carrying the arms K'' and rake-heads K around. The rake-heads being loosely journaled in the frames K', the teeth will always hang down, no matter in what position the reel-arms K'' may be; and in order to pitch the teeth on an incline a weight, $l$, is attached to the rake head or blade, as shown in Figs. 14 and 21, the rake-heads K being provided with suitable holes $l^5$ to receive the end of the weight, so that the weight can be adjusted on either side of the rake-head, to throw the teeth in the opposite direction from that in which it stands.

The object of using a weight to give the teeth the pitch or inclination at different angles is to cause the teeth to act on the grain farther forward or farther back in reference to the cutting-line as required for different conditions of grain, as, where the grain leans forward or away from the travel of the machine, it is necessary for the reel to strike farther forward in order to lift the leaning grain and reel it properly onto the platform, while when the grain is very light it is desirable to have the teeth strike nearer the cutting-line, so as not to be in contact with the head of the grain and act as a comb to rake the heads and scatter the grain, while for medium grain and grain that stands straight, or nearly so, the teeth can be set by the weight to act properly thereon. If the weight is forward of the teeth, it will pitch the teeth back, and vice versa, and the weight will act to keep the teeth in whatever position it turns them, except when the teeth are engaged with the grain or the arm $j$ is locked with the rod $i$. As the rake heads or blades descend and the teeth $l'$ engage the grain, each blade will turn in its journals and bring the arm $j$ in contact with the end of the rod $i$, and hold the rake head or blade rigid, the same as if connected firmly with the reel-arm K'', in which position the reeling is done.

The arm $j$ has sufficient strength to withstand the pressure of the reeling and sufficient flexibility to yield in case the teeth strike any obstacle which would be apt to break them, in which latter case the arm $j$ would spring out and allow its end to pass the rod $i$ and the rake head or blade to revolve.

The reel rake heads or blades are so journaled and the teeth are of such length that the teeth in passing over the sickle will just clear it, and will follow the incline of the section B as the reel continues its revolutions, and each may be timed in such manner as to act on the grain at the time that the platform-rake is in position to take the grain past the inside divider, the positions of the two when they meet on the platform being such that the platform-rake will be in the open space formed by the short teeth of the reel-rake. By this arrangement it will be seen that the reel can be made to lift the butts of the grain to any desired point on the platform, and that in whatever position the butts are left by the reel-rake the platform-rake will take the grain and carry it around with the butts remaining in the same relative position in which delivered. For long grain the reel-rake is to be so adjusted as to leave the butts on or near the line of the sickle, and for short grain it is to be adjusted to lift the butts farther back on the platform, which can be done by the driver, who takes hold of the lever M and moves the pendant M'' forward for the long grain and backward for the short grain, so as to bring the stop $k'$ in position to engage the pin $k$ and trip the reel-rake. The object of having the butts of long or short grain in different positions is to enable the binder-arm to apply the band to the bundle at or near its center.

In order to keep loose grain in position against the platform-rakes and prevent the grain from slipping off the platform, a curved guide-board, J, is provided, extending from the point where the inside divider is located around to the point or near the point where the platform-rake leaves the grain, and of sufficient height to hold the grain on the platform. At the rear end of the curved board J is a board or gate, J', attached at one end to a shaft, J'', suitably journaled in the framework of the machine, and having at its upper end an arm or lever, J³, by means of which the driver can swing the free end of the board J' to or from the binder. The object of this is to furnish another means by which the butts of the grain can be kept in the required position relative to the binder, so that the grain can be bound at or near its center. In long grain the gate can be left so as to be in line, or nearly so, with the end of the guide J, and for short grain its rear end can be advanced toward the binder the distance required.

The frame or support N and the rack N', around which the pinion which moves the binding-arm travels, are cast or formed in a single piece, the rack N' being formed on a longitudinal bar, N'', extending from end to end of the frame. The frame N has its sides parallel and its ends curved, (see Fig. 4,) and is curved longitudinally to correspond with the arc of a circle which the binding-arm describes in its horizontal movement, and the support N is firmly secured to the upper framework of the machine, so as to be over the binding mechanism, by means of a central vertical piece formed therewith and extending across its outer face projecting above its upper side, and bolted by a bracket or plate, N⁴, to the cross-bars V and V' of the frame.

The bar N'' is located at the center of the frame longitudinally, and the rack N' is located thereon so as to be outside of the plane of the inner face of the frame N. The rack has straight parallel sides and curved ends corresponding with the frame. (See Fig. 4.) With this rack a pinion, N³, meshes, which pinion is located on the end of the section R of the driving-shaft, and is held in mesh with the rack by means of a roller, n, loosely mounted on the shaft R, so as to revolve independently of the shaft, the roller traversing the inner face, n', of the frame N.

The section R of the driving-shaft is supported at its outer end by the frame and rack and the pinion and roller, and its inner end is connected by a coupling, R'', with the outer end of the section R', one-half of the coupling being on the end of R and the other on the end of R'. On the section R' is a sprocket-wheel, R³, over which and a sprocket-wheel, R⁴, of the shaft 1'' a chain passes, by means of which wheels and belt the sections R R' are rotated. On the shaft R, back of the pinion N³, is mounted a head, Q, (see Figs. 1, 22, 32, and 33,) the end of which adjacent to the pinion is provided with a flange or rim, Q', which forms a guard to prevent grain, &c., from getting into the pinion and clogging it. On one side of this head, in a suitable arm formed with the head, is secured the binding-arm O, which is curved so that its end will pass through the grain and bring the cord in proper relation to the tying device.

On the side of the head opposite the binding-arm, in a suitable boss or stud, is secured the end of a bar, O', which extends back from the head and is bent or curved, and passes between guide-rollers o, located on a plate or head, o', secured to an arm which projects out from the end of the frame N, as shown in Figs. 1 and 4. This rod O' is curved to act, as the rod passes between the rollers with the movements of the pinion N³ around the rack N', to give the binding-arm the required amount of rise and fall in encompassing the bundle with the binding-cord, the rod being of the required length to travel between the guide-rollers o a distance corresponding to the travel of the pinion around its rack N'.

The compressor-arm P is made from a single piece having a straight portion with a curved end. (See Figs. 4, 22, and 29.) This arm is suspended from arms P' P'', its front end being pivoted to the lower end of the arm P', the upper end of which is loosely connected to an arm, S', near its outer end. The compressor P is also pivoted near its middle to the lower end of the arm P'', the upper end of which is pivoted to a link or bar, P³, which forms a pitman, one end of which is pivoted to the head or block Q and the other end to a collar or bracket rigidly secured to the outer end of the arm S'.

Between the arms P' P'' is attached to the compressor-arm P one end of the chain m, the other end of which is attached to the longitudinal piece V of the upper frame-work.

Around the arm S' and between the head of the pendant P' and a collar on the arm S' is a coil-spring, S. The arm S' is connected with a corresponding arm, S³, by an upright post, S'', both arms standing in a vertical line with each other and both lying in a horizontal position, the connecting-piece standing in a vertical position and being supported in suitable bearings, in which it can turn so as to allow the arms to swing horizontally, and these parts—the connecting-piece S'' and the arms S' S³—are rigidly connected together to form one piece only. The lower arm, S³, swings in a plane parallel, or nearly so, with the knot-tying devices, and the upper one, S', swings in a plane parallel, or nearly so, with the center of the rack N'.

Over the tying device is located the stationary guard-plate or covering T, of sufficient dimensions to cover the entire mechanism, and having in its upper portion a slot, U', into which the binding-cord passes to be brought to the tying devices, the face of the cover adjacent to the slot u'' in the binding-table for the passage of the binding-arm being curved to conform to the curvature of such slot, and the front portion of the cover between such curved face and the slot U' terminates in a point, s'', which projects slightly beyond the plane of the curved face. On the opposite side of the slot u'' is a guide, T', having a recess or groove, t'. This guide is secured to the binding-table, and the covering T is supported at one end by the frame of the rack T″, the other end resting on the binding-table.

To the outer end of the arm S³ is pivoted one end of the link $p$, the other end of which passes through a pivot-block located on the arm or bar which carries the tying mechanism. On this link $p$ are located collars $p'$ in such manner as to bring a collar on opposite sides of the bar which carries the tying mechanism. These collars can be adjusted on the link $p$ at the proper point to alternately engage the arm of the tying mechanism and swing forward and back the distance required to form the knot.

On the outer end of the link $p$ is rigidly but adjustably secured an arm, $r''$, on the other end of which is rigidly secured a curved arm, $r'$, which extends in front of the tying mechanism, and at that end is provided with a cord-carrying head, $r$, in which is a vertical slot, $s$, and a transverse slot, $s'$, the slot $s$ catching the binding-cord when it comes up from under the cover T and carries it forward with the forward movement of the binding mechanism, and the slot $s'$ being adapted to allow the carrying-head to pass the point $s''$ of the covering-plate and insure the catching of the cord by such point on the return movement of the binding-arm, so that the cord will pass into the slot U′. On the side of this head $r$ is located a roller, $t$, which enters the slot $t'$ of the guide T′ and keeps the head in proper position while traveling forward and back, and forms a guide to keep the slot $s'$ in line with the point $s''$ so that said point will enter the slot $s'$ and take the cord caught by the slot $s$.

The knot-tying mechanism is located at the outer end of an arm the inner end of which is pivoted to a frame, so that the tying device will swing and be operated by the rack T″. On the forward end of the arm which carries the tying devices is a hook or catch, $v''$, arranged to engage with a corresponding hook $v'$, pivoted at one end to the side bar of the rack T″, the other end being connected by a rod, $v$, with the end of a lever, $u$, pivoted by a pin, $u'''$, to the bottom C. The portion $u'$ of this lever is curved somewhat, (see Fig. 23,) so as to bring it partly across the slot $u''$ in the binding-table B″, and it is so located and arranged that the binding-arm will engage the face of it and turn the lever on its pivot $u'''$, moving the end of the portion $u$ inward, and releasing the hook $v'$ from engagement with the hook $v''$. To the arm $u$ of this lever is attached one end of a coil-spring, $u^3$, the other end of which is attached to the bottom C, so that when the binding-arm passes from engagement with the arm $u$ the spring will act to return the hook $v'$ in position to again engage the hook $v''$ and lock the tying mechanism on the completion of its forward movement, and remain locked until released by the binding-arm.

The upper frame-work may be of any suitable form. As shown, posts are provided in which the reel-shaft is journaled, and a longitudinal bar, V, and a diagonal brace, V′, extending from the end of the bar V to the end piece, A″, with suitable cross-bars, are provided to furnish the support for the binding-arm and its operating mechanism. The longitudinal piece V is supported by an end post extending up from the cross-piece A⁴, and another post, V″, extending up from the cross-piece A³, and by the diagonal brace V′, which in turn is supported by an upright, V³.

The drive-wheel W is suitably journaled between the cross-pieces A³ A⁴, and is provided with a gear-wheel, W′, by means of which and suitable pinions, shafts, and gears the sickle is driven. A sprocket-wheel, W″, is mounted loosely on the shaft of the drive-wheel; but a suitable clutch is provided by means of which it can be connected with the hub of the drive-wheel and rotate the shaft I″.

The binding-cord $w$ passes from its box or spool through an eye in the point of the needle, thence to the binding mechanism, where its end is caught and held.

The operation of the binding devices is as follows: As the pinion N³ travels across the upper face of the rack N′ in a forward direction, or toward the front of the machine, the binding-arm and compressor will move therewith, both being raised and passing over the grain on the binding-table. As this movement commences, the guide-rod O′, which has been projected entirely out, or nearly so, will be drawn in passing between the guide-rollers $o$, the curvature of the rod acting to turn the head Q down on the side the rod is on and raise it on the opposite side, raising therewith the point of the binding-arm and causing it to follow a curve conforming to the curve of the guide-rod O′. When the pinion N³ has nearly completed its forward movement and is about to pass around the curved end of the rack, the compressor will have been carried therewith to the limit of the chain $m$, and will be thereby retarded from further forward movement while the pinion is passing around the end of the rack, the binding-arm still moving forward with the pinion. This retention of the compressor will cause the pendants P′ P″ to swing on their pivots, and the binding-arm and compressor will be dropped to a lower plane, when the pinion engages with the straight face of the rack at a point opposite to that on which the chain stops the forward movement of the compressor and is in position to move back on the straight face of the rack to that on which it travels forward. During the movement of the pinion around the end of the rack the compressor will be held back by the chain until the point of attachment of the chain $m$ to the arm is brought nearer to the point where the chain is attached to the frame-work. The chain then ceases to act and allows the compressor-arm to move backward, the compressor-arm keeping in the same relation to the binder-arm during the remainder of their backward movement, which relation will be governed by the size of the bundle caught between the two arms. As the pinion $N^3$ passes around the end of the rack $N'$ to the lower side or straight face thereof, the binder-arm will be carried down with its point passing through the grain on the platform, gathering a sufficient quantity of grain for the bundle and carrying it back with the backward movement of the pinion, the lower portion of the binding-arm being beneath the grain for the bundle, and the bundle being formed in the space between the binding-arm and the compressor-arm. As the pinion commences its backward movement, the head Q and guide-arm $O'$ will move with it, turning the head on the side the rod is on up and depressing it on the opposite side, giving the point of the binding-arm a movement the same as that it described on its forward movement, but in a lower plane. This return movement will carry with it the arm $S'$, turning the shaft $S''$ in its bearings and swinging the arm $S^3$, the two arms $S'$ and $S''$ moving together, and both having been carried forward in the movement of the head Q by reason of their connection with the head through the link $P^3$. At the conclusion of the forward movement of the arm $S^3$ the tying mechanism will have been carried forward by the engagement of the outer stop, $p'$, with the arm carrying the tying devices, and as this arm $S^3$ commences its return movement the link $p$ will slide through the block on the arm of the tying mechanism until the inner one of the stops $p'$ comes in contact with such arm, at which time the binding-arm will have been carried to a point in the slot $u''$ in the binding-table where it engages the end $u'$ of the lever $u$ and releases the catch $v'$ from the catch $v''$, leaving the tying mechanism free to be carried back by the arm $S^3$, during which the tying will be done. This backward movement will continue until the pinion $N^3$ has reached the end of the rack $N'$, on which it first started, and has passed around one-half of the curved end thereof. On this return movement the binding-arm approaches the compressor-arm to the extent of the curve which its point is made to describe by the action of the curved guide-rod $O'$, but remaining otherwise in the same position to said compressor as that in which it first started. As the pinion commences its travel around the rear curved end of the rack, the compressor and binding arm will be raised thereby to a higher plane, and at the same time will be opened by reason of the binding-arm being carried farther up by the raising of the block Q on the side to which the binding-arm is attached through the action of the curved guide-rod $O'$, which movement carries the binding-arm away from the curved end of the compressor-arm, the compressor-arm being held and prevented from swinging forward toward the front of the machine by the engagement of the stop $m'$ with the upper face of the arm, said stop being located on the pendant $P''$ at a point to engage with the compressor-arm and hold it as the pinion commences to turn around the curved end of the rack. As the binding-arm commences its backward movement, the head $r$ will commence to return, and when this head reaches the point $s''$ such point will enter the slot $s'$ and take the string from the slot or fork $s$ and guide it into the slot $U'$, the string having been caught in the slot $s$ when the head $r$ was moving forward, the string being that which passes from the point where held in the tying devices and passing beneath the cover T to the binding-arm, and which is on the rear side of the bundle. The object of catching the string by this head $r$ and carrying it forward thereby is to insure the entrance of that part which is caught and passes behind the bundle into the slot $U'$. The bundle after being bound and released from the compressor and binder arms lies upon the rear part of the binding-table, where it will remain until the next backward movement of the binder and compressor arm, their action in moving the next bundle caught discharging the bundle just bound from the table. As the pinion $N^3$ passes around the rear curved end of the rack $N'$ and reaches the upper straight face of the rack, the several parts will all have been returned to the limit of the backward movement and be again in position to be carried forward in the manner first described.

The movements of the binding-arm are so timed with relation to the movements of the platform-rake that the binding-arm will enter the grain on the platform about midway between two of the rakes with the forward rake in the act of being withdrawn from the grain that the binder-arm has passed around, and with the rear or next succeeding rake following after the binding-arm to carry the grain between the arm and this rake around on the next form.

When it is desired to throw the binder out of operation, the treadle $Z'$ of the bar Z is employed to disengage a suitable clutch on the shaft $I''$, which engages with the sprocket-wheel $R^4$.

The compressor P is self-adjusting to the different sizes of bundles by means of the coiled spring S on the link $P'$ and the collar on the arm $S'$ or the shaft itself, said spring also furnishing the power for compressing, the tendency of the spring being always to draw the compressor-arm forward by making the pendant $P'$ turn forward at its lower end, which movement of the pendant tends to draw the curved end of the compressor-arm P forward toward the binding-arm to compress the bundle between such curved end and the binding-arm, the spring also acting to force this curved end of the compressor-arm in a downward direction as well as in a forward direction. This movement is obtained by pivoting the compressors on the pendants $P'$ $P''$, which pendants swing in a curve downward, first after the compressor is drawn well back and then forward. The spring uncoils to throw the arm forward, and coils tighter when the arm is in its backward position.

Having thus described my invention, what I claim is—

1. A platform-rake for a harvester, consisting of a horizontal arm or blade and base or support therefor having a roller, and pivotally mounted or attached to a driving-chain, and mechanism, substantially as set forth, to allow the arm to be projected when carrying the grain, and to be folded on its return movement and withdrawn from the grain in a direction lengthwise of the grain which has been carried around, substantially as described.

2. In a harvesting-machine, an arm or blade for a platform-rake, consisting of two or more flexible fingers or strips united at their inner ends to a rigid arm or support for allowing the fingers to open or spread apart when in position for carrying the grain, and to be closed or brought together again in turning the rake, substantially as and for the purpose specified.

3. In a platform-rake for harvesting-machines, a rake adapted to withdraw from the grain after it has been turned in a direction lengthwise of the turned grain, in combination with a cover, B³, to protect the rake and serve to strip the grain from the rake-teeth when the rake is being withdrawn from the grain, substantially as specified.

4. In a platform-rake for harvesting-machines, the combination, with the rake-head provided with horizontally-projecting teeth, of the rake-operating mechanism and suitable guides on the platform with which the rake engages, whereby it is actuated to carry the grain from the outside divider past the inside divider, turn it partly around with the butts toward the drive-wheel, then withdraw it from the grain lengthwise of the grain, where it withdraws from it, and move toward the outside divider, and lastly swing toward the cutter-bar and move forward along the outside divider to the cutter-bar, to again engage the grain, substantially as described.

5. The combination, with the horizontally-projecting and folding rake-head, of the stationary guide E, acting directly on the rake-teeth to hold them projected horizontally while raking the grain and carrying it around, and the rake adapted to withdraw from the grain lengthwise of the grain, substantially as described.

6. In a platform-rake for a harvesting-machine, a guide, E′, in combination with a rake having guide-rollers thereon for keeping the rake in position to be projected, substantially as described.

7. In a platform-rake for a harvesting-machine, a support or guide, E″, in combination with a rake for raising the blade portion and allowing it to pass above the platform or cover B′, substantially as described.

8. In a platform-rake for a harvesting-machine, in combination with a rake, a support or guide, E³, for supporting the rake on the return movement when folded, substantially as described.

9. In a platform-rake for a harvesting-machine, a bridge or support, E⁴, located on the end of the guide or support E³, for holding the rake up and guiding it to the guide by which it is turned, substantially as described.

10. In a platform-rake for a harvesting-machine, a guide, b, in combination with a rake having guide-rollers thereon for turning the rake in position to be projected horizontally across or over the platform in the position to rake the grain, substantially as described.

11. In a platform-rake for a harvesting-machine, a bridge or support, e, in combination with a rake having guide-rollers thereon for supporting the rake and guiding it into position to travel across the platform, substantially as described.

12. In a platform-rake for a harvesting-machine, the guide e′, in combination with a rake having guide-rollers thereon for turning the rake to carry the bundle around the curved portion of the receiving-platform, substantially as described.

13. In a platform-rake for a harvesting-machine, a series of guides and supports, E, E′, E″, E³, E⁴, b, e, and e′, in combination with a rake having guide-rollers thereon for guiding and directing the movements of the rake as it passes around the platform, substantially as described.

14. In a platform-rake for a harvesting-machine, a driving-chain, F′, carrying the rakes F, in combination with a main sprocket-wheel, F″, secondary sprocket-wheel h′, mounted on the end of a pivoted bar, G, and acting as a tightener to keep the driving-chain taut, guide b, connection G′, and the slotted casting G″, substantially as described.

15. In a platform-rake for a harvesting-machine, a driving-chain, F′, carrying the rakes F, in combination with sprocket-wheel h′, tightener-bar G, guide E′, and connection G′, all operating together substantially as described.

16. In a harvesting-machine, an overhanging reel consisting of a rake journaled on the outer end of the reel-arms, and allowed to hang teeth downward during the whole revolution of the reel, and a locking device to hold the rake rigid while reeling and raking the grain, in combination with a tripping mechanism for disengaging the locks, consisting of a curved bar attached to the rake-heads, and engaging with rods connected to bell-cranks pivoted to a spider, to which the reel-arms are secured, substantially as described.

17. In a harvesting-machine, an overhanging reel having rakes journaled on the outer end of the reel-arms that are allowed to hang teeth downward during the whole revolution of the reel, and a locking and tripping device to hold the rake rigid while working upon the grain, and allowing it to swing loose at the completion of its work, in combination with the tripping devices, consisting of a curved bar attached to the rake-heads, and engaging with rods connected to bell-cranks pivoted to the spider of the reel-arm, and thus make the rake operative at any desired point, substantially as described.

18. In a harvesting-machine, an overhung reel for reeling and raking grain, consisting of a rake-head, K, journaled in the support K' on the outer end of the reel-arm K'', and provided with a locking-arm, $j$, in combination with a rod, $i$, bell-crank lever $i'\ i''$, stop or pin $k$, and stop $k'$ on the pendant M'' for locking and releasing the rake, substantially as described.

19. In a harvesting-machine, an overhung reel for reeling and raking grain, having rakes journaled on the outer ends of the reel-arms, in combination with weights attached to the rake-heads for balancing the rakes and adjusting the slanting pitch of the teeth for the purpose of making the ends of the teeth enter the grain at different points, substantially as described.

20. In a harvesting-machine, a frame or support overhanging the binder-platform, and having a longitudinally and vertically curved shape, and provided with a longitudinal rack and guide-face, in combination with a pinion, and a divided shaft carrying the binding-arm, and having a connection between its two sections by a coupling or joint which allows the pinion to travel over the rack, substantially as described.

21. In a harvesting-machine, a frame or support overhanging the binder-table, and having a longitudinally and vertically curved shape, and provided with a longitudinal rack, and a track or guide-face, in combination with a pinion and guide-roller, and a shaft carrying a binding-arm, substantially as described.

22. In a harvesting-machine, a frame or support, N, provided with a rack, N', and a track or guide face, $n'$, in combination with a pinion, N³, guide-roller $n$, divided shaft R R', carrying the binding-arm, and the curved rod O', operated by the guide-rollers $o\ o$, for giving the arm the required swing, substantially as described.

23. In a harvesting-machine, the combination of a horizontally-swinging and vertically-moving binding-arm, with a horizontally-swinging and vertically-moving compressor-arm suspended by depending arms or pendants, and a retarding device for stopping the movement of the compressor-arm, and a mechanism for moving both arms, substantially as described.

24. In a harvesting-machine, the combination of a binding-arm, O, with a compressor-arm, P, depending arms or pendants P' P'', spring S, and arm or support S' for allowing the compressor-arm to adjust itself to bundles of different sizes, substantially as described.

25. In a harvesting-machine, a head or block, Q, carrying a binding-arm on one side and a guide-rod on the opposite side, and mounted loosely on a shaft, in combination with such shaft and an operating mechanism therefor for controlling the movements of the binding-arm and bringing it properly to the binding mechanism, substantially as described.

26. In a harvesting-machine, the combination of a swinging shaft carrying the binding-arm with a link or pitman, P³, compressor-arm P, depending arms or pendants P' P'', and arm S', for carrying and operating the compressor-arm, substantially as described.

27. In a harvesting-machine, the combination, with a binding-arm and a knot-tying mechanism, of a swinging shaft carrying the binding-arm, arms S' S³ S'', and connecting-links P³ and $p$, all constructed and arranged substantially as and for the purposes specified.

28. In a harvesting-machine, a swinging arm or lever, S³, operating in conjunction with a binding-arm, in combination with a link, $p$, having stops $p'\ p'$, for operating the knot-tying mechanism and keeping it in proper relation to the binding-arm, substantially as described.

29. In a harvesting-machine, a head or fork, $r$, located and operating adjacent to the tying mechanism, in combination with a point or hook, $s''$, for taking the cord from the head or fork and guiding it into the tying devices, substantially as described.

30. In a harvesting-machine, a hook or catch, $v'$, located on the tying-mechanism frame, and a pivoted hook or catch, $v''$, in combination with a link or connecting-rod, $v$, and pivoted lever or arm $u\ u'$, for automatically releasing the hooks or catches, substantially as and for the purpose specified.

31. In combination with a platform-rake and mechanism whereby the rake is caused to move the grain across the platform from the outside to the inside divider, and then turn it partly around with the butts toward the drive-wheels, and is afterward withdrawn from the grain in the direction of the length of the grain, a binder-arm, O, and mechanism that causes the arm to take the grain directly from such rake, travel backward toward the rear of the platform with the grain to deposit it at the rear of the machine, thereby completing a rear delivery of the bundle, substantially as and for the purposes specified.

MAURICE E. BLOOD.

Witnesses:
SAMUEL W. WINDERS,
SYLVANUS HOLCOMB.